US010926178B1

(12) United States Patent
Batty et al.

(10) Patent No.: US 10,926,178 B1
(45) Date of Patent: Feb. 23, 2021

(54) PRESENTING PLAYABLE GAMEPLAY MOMENTS DURING A SIMULATION OF A GAME

(71) Applicant: Electronic Arts Inc., Redwood City, CA (US)

(72) Inventors: Joseph Todd Batty, Richmond (CA); Thomas Andrew Phillips Munro, Burnaby (CA)

(73) Assignee: Electronic Arts Inc., Redwood City, CA (US)

( * ) Notice: Subject to any disclaimer, the term of this patent is extended or adjusted under 35 U.S.C. 154(b) by 205 days.

(21) Appl. No.: 16/024,592

(22) Filed: Jun. 29, 2018

(51) Int. Cl.
| | | |
|---|---|---|
| *A63F 13/58* | (2014.01) | |
| *A63F 13/812* | (2014.01) | |
| *A63F 13/46* | (2014.01) | |
| *A63F 13/798* | (2014.01) | |
| *A63F 13/497* | (2014.01) | |

(52) U.S. Cl.
CPC .............. *A63F 13/58* (2014.09); *A63F 13/46* (2014.09); *A63F 13/497* (2014.09); *A63F 13/798* (2014.09); *A63F 13/812* (2014.09); *A63F 2300/303* (2013.01); *A63F 2300/634* (2013.01); *A63F 2300/65* (2013.01); *A63F 2300/8011* (2013.01)

(58) Field of Classification Search
CPC ...... A63F 13/822; A63F 13/58; A63F 13/816; A63F 13/828
See application file for complete search history.

(56) References Cited

U.S. PATENT DOCUMENTS

| 10,478,730 | B1* | 11/2019 | Burnett | .................. A63F 13/20 |
|---|---|---|---|---|
| 2007/0244878 | A1* | 10/2007 | Hulme | .................... A63F 13/12 |
| 2008/0312010 | A1* | 12/2008 | Marty | ................ A63B 24/0003 473/447 |
| 2013/0324245 | A1* | 12/2013 | Harvey | ................... A63F 13/49 463/31 |
| 2013/0326374 | A1* | 12/2013 | Harvey | .................. A63F 13/49 715/756 |

(Continued)

OTHER PUBLICATIONS

"Madden NFL 17 Franchise Blog Part 1 Play the Moments and Gameplanning" available at least by Jul. 30, 2016, available at https://web.archive.org/web/20160730070918/https://www.easports.com/madden-nfl/news/2016/madden-17-franchise-moments-and-gameplan, last accessed, Jul. 30, 2020. (Year: 2016).*

*Primary Examiner* — Jay Trent Liddle
(74) *Attorney, Agent, or Firm* — McDermott Will & Emery LLP

(57) ABSTRACT

Methods and systems for displaying a playable interaction in a simulated game are provided. In one aspect, a method includes receiving, from a device of a user, a plurality of player selections for a first team, calculating an overall team rating for the first team, calculating a number of scoring chances for the first team, simulating, based on the number of scoring chances, a first portion of the game until a predetermined type of interaction between the first team and the second team occurs, displaying the predetermined type of interaction, providing control of the first team for predetermined type of interaction, simulating, based on the number of scoring chances, a second portion of the game until a second predetermined type of interaction occurs, displaying the second predetermined type of interaction, providing control of the first team for the second predetermined type of interaction.

14 Claims, 8 Drawing Sheets

(56) References Cited

U.S. PATENT DOCUMENTS

| | | | |
|---|---|---|---|
| 2016/0067606 A1* | 3/2016 | Fernandez | A63F 13/63 |
| | | | 463/31 |
| 2016/0067607 A1* | 3/2016 | Fernandez | A63F 13/63 |
| | | | 463/31 |
| 2017/0266557 A1* | 9/2017 | Fujiwara | A63F 13/56 |
| 2018/0040043 A1* | 2/2018 | Kluver | A63F 13/792 |
| 2019/0394521 A1* | 12/2019 | Wahlquist-Ortiz | |
| | | | H04N 21/2187 |
| 2020/0038757 A1* | 2/2020 | Burnett | A63F 13/828 |

* cited by examiner

PRESENTING PLAYABLE GAMEPLAY MOMENTS DURING A SIMULATION OF A GAME

TECHNICAL FIELD

The present disclosure generally relates to improving user interaction with a video game, and more specifically relates to user interaction with a video game on a mobile computing device.

BACKGROUND

Mobile computing devices, such as smartphones and tablets, have increasingly become the primary computing devices for many users. Accordingly, many users have preferred to play their favorite sports video games that they used to play on traditional computing devices, such as a desktop computer or a video game console, on their mobile computing devices. However, the duration of a single game in sports video games is commonly too long for the normal contiguous usage of a mobile computing device. Furthermore, the duration of the single game is commonly too long for a user to play against another user who is also playing using a mobile computing device.

SUMMARY

The present disclosure provides for a game mode that generates a series of playable moments from the game, and presents the playable moments to the user to allow the user to play the game faster and increase engagement with the game.

According to one embodiment of the present disclosure, a computer-implemented method is provided. The method includes receiving, from a device of a user, player selections for a first team in a game between the first team and a second team. The method also includes calculating, based on the player selections for the first team, an overall team rating for the first team. The method also includes calculating a number of scoring chances for the first team in the game. The method also includes simulating, based on the number of scoring chances, a first portion of the game between the first team and the second team until a first predetermined type of interaction between the first team and the second team occurs. The method also includes displaying, on the device of the user, the first predetermined type of interaction in the game. The method also includes providing control of the first team to the device of the user for the first predetermined type of interaction. The method also includes simulating, based on the number of scoring chances, a second portion of the game between the first team and the second team until a second predetermined type of interaction between the first team and the second team occurs. The method also includes displaying, on the device of the user, the second predetermined type of interaction in the game. The method also includes providing control of the first team to the device of the user for the second predetermined type of interaction.

According to one embodiment of the present disclosure, a non-transitory computer readable storage medium is provided including instructions that, when executed by a processor, cause the processor to perform a method. The method includes receiving, from a device of a user, player selections for a first team in a game between the first team and a second team. The method also includes calculating, based on the player selections for the first team, an overall team rating for the first team. The method also includes calculating a number of scoring chances for the first team in the game. The method also includes simulating, based on the number of scoring chances, a first portion of the game between the first team and the second team until a first predetermined type of interaction between the first team and the second team occurs. The method also includes displaying, on the device of the user, the first predetermined type of interaction in the game. The method also includes providing control of the first team to the device of the user for the first predetermined type of interaction. The method also includes simulating, based on the number of scoring chances, a second portion of the game between the first team and the second team until a second predetermined type of interaction between the first team and the second team occurs. The method also includes displaying, on the device of the user, the second predetermined type of interaction in the game. The method also includes providing control of the first team to the device of the user for the second predetermined type of interaction.

According to one embodiment of the present disclosure, a system is provided that includes means for storing instructions, and means for executing the stored instructions that, when executed by the means, cause the means to perform a method. The method includes receiving, from a device of a user, player selections for a first team in a game between the first team and a second team. The method also includes calculating, based on the player selections for the first team, an overall team rating for the first team. The method also includes calculating a number of scoring chances for the first team in the game. The method also includes simulating, based on the number of scoring chances, a first portion of the game between the first team and the second team until a first predetermined type of interaction between the first team and the second team occurs. The method also includes displaying, on the device of the user, the first predetermined type of interaction in the game. The method also includes providing control of the first team to the device of the user for the first predetermined type of interaction. The method also includes simulating, based on the number of scoring chances, a second portion of the game between the first team and the second team until a second predetermined type of interaction between the first team and the second team occurs. The method also includes displaying, on the device of the user, the second predetermined type of interaction in the game. The method also includes providing control of the first team to the device of the user for the second predetermined type of interaction.

According to one embodiment of the present disclosure, a system is provided including a memory storing sequences of instructions, and a processor configured to execute the sequences of instructions, which when executed, causes the processor to perform from a device of a user, player selections for a first team in a game between the first team and a second team. The execution of the sequences of instructions also causes the processor to perform calculating, based on the player selections for the first team, an overall team rating for the first team. The execution of the sequences of instructions also causes the processor to perform calculating a number of scoring chances for the first team in the game. The execution of the sequences of instructions also causes the processor to perform simulating, based on the number of scoring chances, a first portion of the game between the first team and the second team until a first predetermined type of interaction between the first team and the second team occurs. The execution of the sequences of instructions also causes the processor to perform displaying, on the device of the user, the first predetermined type of interaction in the game. The execution of the sequences of instructions also causes the processor to perform providing control of the first team to the device of the user for the first predetermined type of interaction. The execution of the sequences of instructions also causes the processor to perform simulating, based on the number of scoring chances, a second portion of the game between the first team and the second team until a second predetermined type of interaction between the first team and the second team occurs. The execution of the sequences of instructions also causes the processor to perform displaying, on the device of the user, the second predetermined type of interaction in the game. The execution of the sequences of instructions also causes the processor to perform providing control of the first team to the device of the user for the second predetermined type of interaction It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings.

Figure 1:
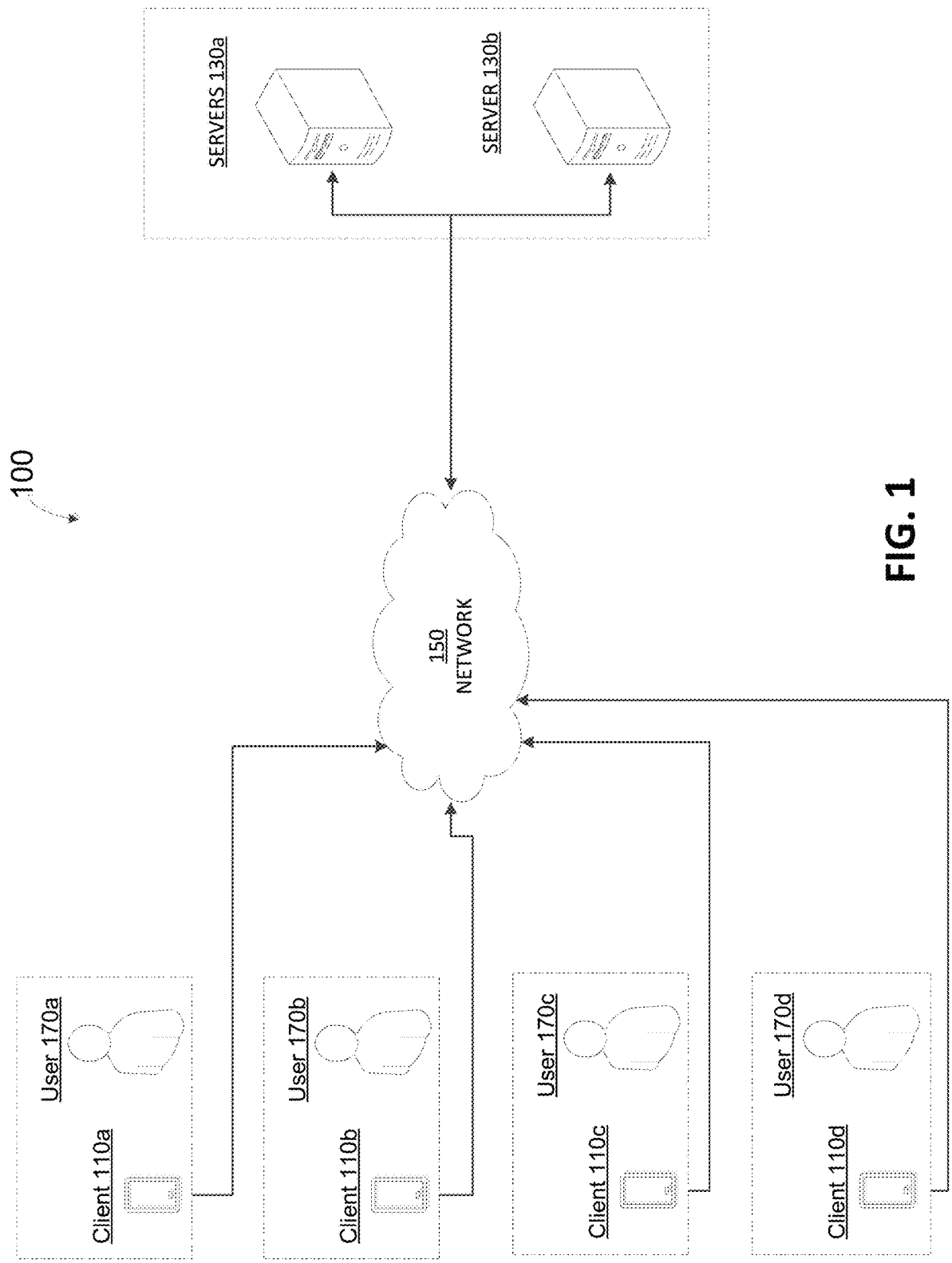
FIG. 1 illustrates an example architecture for presenting playable gameplay moments to a user.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

Many sports video games attempt to simulate the real-life experience of playing that particular sport at the professional or collegiate level. Users playing these video games enjoy simulating full immersion into the real-life experience provided by these titles. While many users enjoy the experience, they particularly enjoy particular "highlight" moments they encounter while playing a match or game in the video game. Examples of such highlight moments can be a breakaway during a soccer video game or attempting to score or defending against your opponent scoring in the final minutes of a game. One approach to increasing the amount of time a user spends engaged in highlight moments is to create a game mode where such highlight moments are identified and presented to a user as playable interactions.

The techniques and methods described herein provide for calculation of scoring chances for a user's team and a simulation of a game between the user's team and another team, based in part on the scoring chances of the user's team. The techniques and methods described herein provide for calculation of scoring chances for each user's team and a simulation of a game between at least a first user's team and a second user's team. In certain aspects, the simulation of the game is performed simultaneously for the users. The techniques and methods described herein also provide for generation of predetermined type of interactions in the game, and presentation of the predetermined type of interactions in the game. Examples of predetermined type of interactions in the game include, but are not limited to, playable moments or interactions generated during the simulation of game. The techniques and methods described herein also provide for generation of playable moments during the simulation of the game, and presentation of the playable moment to the user. The generation of playable moments may be for each user based on that user's selected players, offensive tactics, defensive tactics, counter tactics, and the like. After presentation of the playable moment, the user of the team for whom the playable moment is generated is also provided control to control a player in the playable moment. Thereby allowing a user to engage in highlight moments of a game, such as moments where the user has best chances to score or defend against an opponent from scoring, while allowing the remainder of the game to be simulated. Thus, a user is able to engage for longer durations experiencing highlight moments when playing the video game.

Example System Architecture

FIG. 1 illustrates an example architecture 100 for presenting playable gameplay moments or interactions during a simulation of a game. The architecture 100 includes clients 110a, 110b, 110c, 110d, generally referred to herein as clients 110, and servers 130a, 130b, generally referred to herein as servers 130 connected over a network 150. Users 170a, 170b, 170c, 170d, generally referred to herein as users 170, interact with respective clients 110 and transmit data, including instructions, to servers 130.

Servers 130 may be configured to be cloud computing servers that provide platform-as-a-service (PaaS) and/or software-as-a-service (SaaS) services. Examples of platforms and/or software hosted by the servers 130 include, but are not limited to, video game applications and related video game data, including virtual-world data related to users 170. Examples of virtual-world data related to users 170 includes, but are not limited to, users 170 account information, preferences, video game state data saved by users 170, and the like. Video game state data associated with users 170 includes selections made by users 170 within a particular instance of a video game. For example, if the video game is a type of a sport simulation video game, then the video game state data associated with users 170 includes team and/or player selections made by users 170, saved instances of matchups, and the like. In some implementations, for purposes of load balancing, multiple servers 130 may host the above described applications and data. The servers 130 can be any devices having an appropriate processor, memory, and communications capability for hosting data and video game applications including hosting video game applications as a service.

The clients 110 include one or more computing devices, including but not limited to, mobile devices (e.g., a smartphone or PDA), tablet computers, laptop computers, desktop computers, video game consoles, and/or other devices capable of running a video game. In some implementations, the clients 110 may include a storage medium that includes logic to provide a game simulation. In some implementations, the game simulation provided by the client 110 is an electronic video game that may be executable by one or more processors of the client 110. The game simulations are each individually stored on media, such as flash memory, stead-state memory, removable media storage, game cartridges, or other storage media. In some implementations, instances of a game application may be downloaded and stored on storage media of the clients 110. The clients 110 are configured to transmit data to the servers 130 in response to inputs received from users 170. In some implementations, clients 110 are configured to download video game data associated with the user 170 and stored on the servers 130, upon starting the instance of the game application being hosted on the client 110.

A game application may be also referred to as a game code and/or a game program. A game application should be understood to include software code that the client 110 uses to provide a game simulation for a user to interact with (or play). A game application may include software code that informs the client 110 of processor instructions to execute, but may also include data used in the playing of the game, such as data relating to constants, images and other data structures created by the game developer. A user 170 interacts with the game application and the client 110 through user input/output (I/O) devices. The clients 110 may each execute a separate instance of a game application. Additional details of clients 110 are described below with reference to FIG. 2.

The clients 110 and the servers 130 are communicatively coupled to each other over the network 150. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example System for Presenting Playable Highlight Moments

Figure 2:
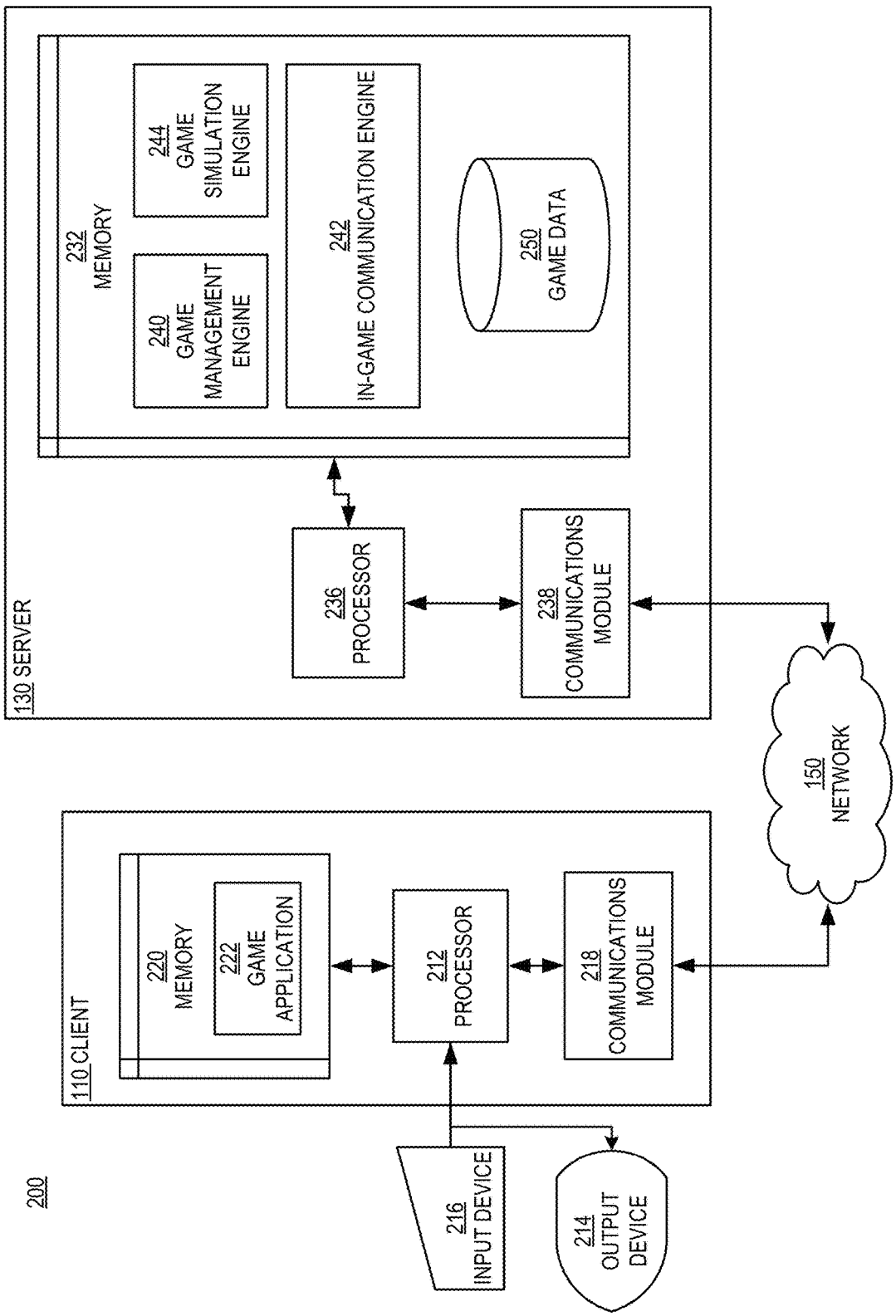
FIG. 2 is a block diagram illustrating the example clients and servers from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a memory 232, a processor 236, and a communications module 238. The memory 232 of the server 130 includes a game management engine 240, an in-game communication engine 242, a game simulation engine 244. The processor 236 of the server 130 is configured to execute instructions, such as instructions physically coded into the processor 236, instructions received from software in the memory 232, or a combination of both. The game management engine 240 receives inputs from users 170 via clients 110 over the network 150. Examples of inputs received by the game management engine 240 include, but are not limited to, selection of plays, players, teams, and the like. The game management engine 240 is configured to save the user's selections and provide the data to other engines within memory 232, such as the game simulation engine 244, in-game communication engine 242, and/or save data related to the user's selections in game data repository 250.

The game simulation engine 244 is configured to generate multiple simulation attributes of a game between two users, such as user 170*a*, 170*b*. The simulation attributes of a game include scoring chances for each team, identification of playable highlight moments for each of the users, based on data from game management engine 240, such as the team selected by the user, the players selected by the user, the one or more tactics selected by the user. In some implementations, the game simulation engine 244 may be configured to retrieve this data from the game data repository 250. The game simulation engine 244 is configured to generate playable highlight moments and/or identify playable highlight moments and present the playable highlight moments to the user whose team has that playable highlight moment. Additional details of generation, identification, and/or presentation of the playable highlight moments are described below with reference to FIG. 3.

The game simulation engine 244 is configured to transmit data to users specifying information related to the state of the game including, summary of the actions taken by the opponent user, summary of actions or events that occurred while the game was in complete simulation mode. As used herein, the term "complete simulation" refers to when no user is provided control of any plays or players in the game. The game simulation engine 244 is configured to update scores for all users in the game in real-time or near real-time. The game simulation engine 244 is configured to track various chances generated for each team and generate playable highlight moments or interactions for that team based on the number and type of chances already generated for that team and the calculated probability of the type of chances for that team. Additional details of calculating probability of the type of chances and the generating of the chances are provided below with reference to FIG. 3. The game simulation engine 244 is configured to determine whether a game has ended or not, and present corresponding graphical user interfaces (GUI) on the client 110 of the user 170, such as an end of game GUI that provide a summary of the game.

The in-game communication engine 242 is configured to present GUIs configured to receive and display communications, referred to herein as "communication GUI," from one user to another user that are playing in the game, such as user 170*a*. The in-game communication engine 242 is configured to present communication suggestions to the users of the game based on the state of the game. For example, the in-game communication engine 242 may present a "Good luck!" message suggestion to the users at the beginning of the game or a "Good game!" message suggestion to the users at the end of the game. Similarly, the in-game communication engine 242 may present other types of messages that indicate an action or an event that occurs during the game. For example, the in-game communication engine 242 may display a message indicating that a user scored a goal in response to a user scoring a goal. Similarly, the in-game communication engine 242 may display a message that a user's is building up momentum to indicate to a user that the team has performed well over a series of plays. In some implementations, the in-game communication engine 242 receives instructions from other modules or engines within server 130. For example, in response to a team scoring a goal, game simulation engine 244 may transmit instructions to the in-game communication engine 242 to display the graphical message corresponding to scoring of a goal.

The game data repository 250 may be usable to store variables and other game and processor data as needed. The game data repository 250 may be used to retain data that is generated during the play of a game and portions thereof may also be reserved for frame buffers, game state and/or other data needed or usable for interpreting user input and generating game displays. The game data repository 250 also may include game code and/or data that provides game rules, prerecorded poses/paths, environmental settings, character movement constraints, and character models.

The client 110 includes a processor 212, the communications module 218, and the memory 220 that includes a game application 222. The game application 222 may be a streaming engine and/or simulation engine, or physically coded instructions that execute a simulation of a sporting event, such as a sports-themed video game. The client 110 also includes an input device 216, such as a keyboard, mouse, touchscreen and/or game controller, and an output device 214, such as a display. The processor 212 of the client 110 is configured to execute instructions, such as instructions physically coded into the processor 212, instructions received from software in the memory 220, or a combination of both. The processor 212 of the client 110 executes instructions from the game application 222 causing the processor 212 to transmit user inputs and data from the game application 222 to the server 130 via the communications module 218. The user 170, via the game application 222, being executed on client 110, interacts with the game management engine 240, the in-game communication engine 242, and the game simulation engine 244.

The client 110 executing the game simulation may have memory (e.g., 220) for game state, character states and scene object storage. Character states include storage for a current pose of characters being animated. In some aspects, the game data repository 250 also includes the game state, character states and scene object storage. The client 110 provides for user input to control aspects of the game according to game rules. The game rules may be specified in instruction form on media stored in the client 110 and/or accessed from the server 130 via the game data repository 250. Examples of game rules include rules for scoring, possible inputs, actions/events, movement in response to inputs, and the like. The client 110 may include a separate graphics processor (not shown). As described above, the client 110 may be a handheld video game device, a console (special purpose) computing system for operating computer games such as video games, a general-purpose laptop or desktop computer, or other suitable system.

In some implementations, the server 130 via processor 236 and game simulation engine 244 can simulate a game between a first team and a second team based, in part, on a number of scoring chances determined for a first team. Scoring chances can be calculated by the game simulation engine 244 based on several game factors including, but not limited to, the overall team ratings, the ratings of each attribute of the team, ratings of the players on the team, and/or the like. In some implementations, the game simulation engine 244 is configured to calculate scoring chances across multiple categories. Additional details of scoring chances are described below with reference to FIG. 3. In some implementations, the game simulation engine 244 may assign a probability value for each category of scoring chances and may calculate a number of scoring chances for each category of scoring chances based on the probability value assigned to the category of scoring chances.

In some implementations, the game simulation engine 244 may be configured to adjust the probability values for each category of scoring chances based on a number of scoring chances generated for a category of scoring chances, and simulate the game based on the adjusted probability values. In some implementations, the game simulation engine 244 may be configured to display the number of scoring chances by categories of scoring chances. In some implementations, the server 130 may identify a playable moment or interaction in the game and provide control of the playable moment in the game to the user of the first team. Additional details of providing control to the user are described below with reference to FIG. 3.

The techniques described herein may be implemented as method(s) that are performed by physical computing device(s), as one or more non-transitory computer-readable storage media storing instructions which, when executed by computing device(s), cause performance of the method(s), or, as physical computing device(s) that are specially configured with a combination of hardware and software that causes performance of the method(s).

Figure 3:
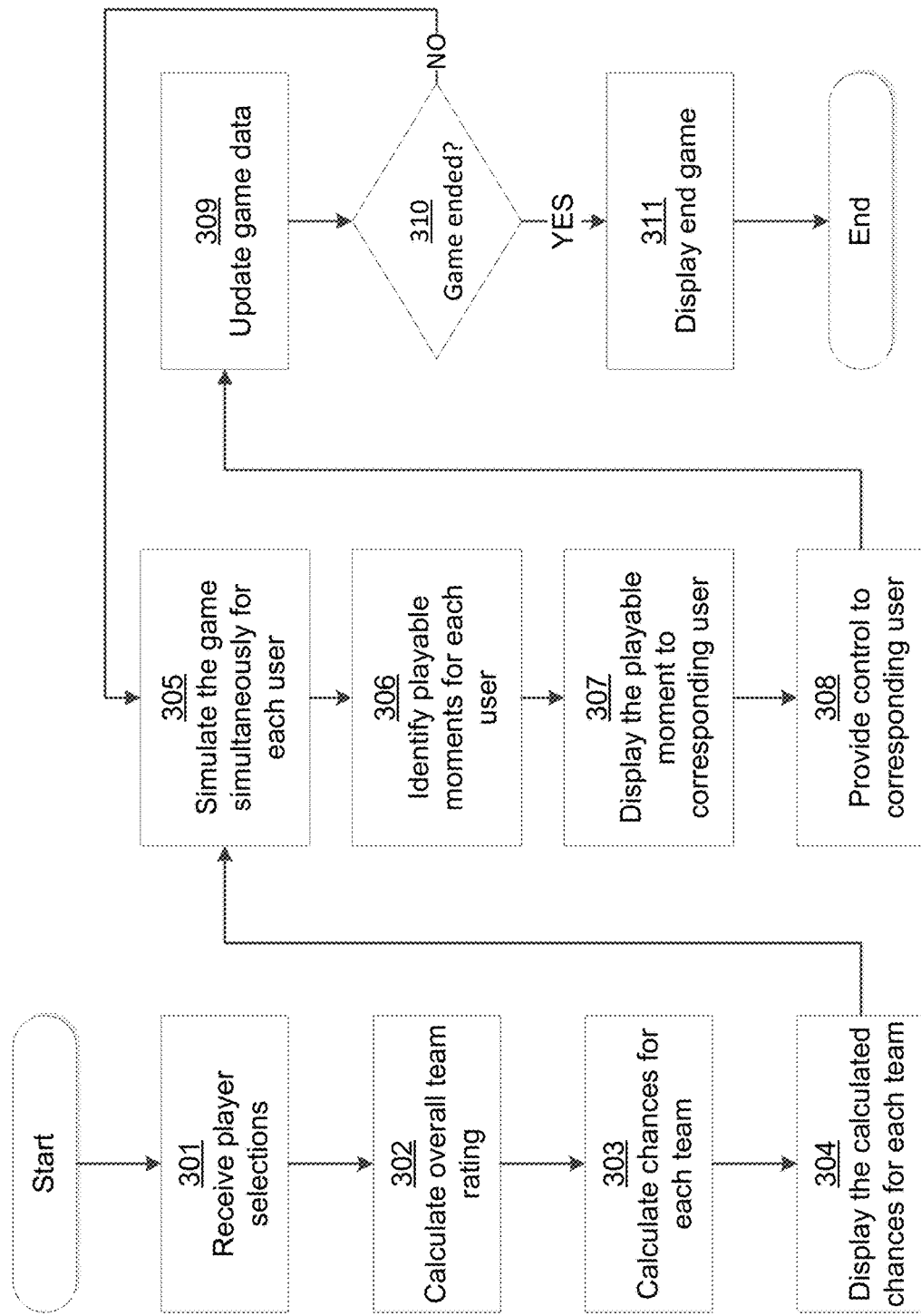
FIG. 3 illustrates an example process for presenting playable gameplay moments to a user using the example server of FIG. 2.

FIG. 3 illustrates an example process 300 of presenting playable highlight moments to a user 170 using a computing device executing an instance of the game application, such as client 110 executing game application 222 of FIG. 2. For explanatory purposes, the example process 300 is described herein with reference to the processors 212 and 236 of FIG. 2. However, the example process 300 is not limited to the processors 212 and 236 of FIG. 2, and one or more blocks of the example process 300 may be performed by one or more other components of the server 130, including game management engine 240, game simulation engine 244, in-game communication engine 242. Further for explanatory purposes, the blocks of the example process 300 are described herein as occurring in serial, or linearly. However, multiple blocks of the example process 300 may occur in parallel. In addition, the blocks of the example process 300 need not be performed in the order shown and/or one or more of the blocks of the example process 300 need not be performed. For purposes of explanation of the subject technology, the process 300 will be discussed in reference to FIG. 2.

Figure 4A:
FIG. 4A-FIG. 4D illustrates example user interfaces presented to a user to receive user input.

At step 301, the game management engine 240 of server 130 receives player selections of players that comprise the team for a user 170, such as a user 170a. The server 130 may receive the player selections from the client 110, such as the client 110a. The server 130 may present or cause a GUI, configured for selection of the players for a team, on a client, such as a client 110a in order to allow a user, such as user 170a, to make the selections. The user, such as user 170a, may select players for his or her team using the GUI displayed on the client 110*a* and the user 170*a* selections are transmitted to the server 130 via network 150. An example of the GUI displayed on the client 110*a* is shown in FIG. 4A. The user selections of the players for the team are stored in a storage unit, such as game data 250. Each player is assigned an overall rating and a rating for each skillset of the player, referred to herein as "attributes of the player". For example, a player may be assigned an overall rating of 80 and a rating of 90 for kicking strength. In some implementations, each player's rating is based in part on the position of the player and the attributes that have been specified as important to the position of the player. For example, a player who is a goal keeper can have a high rating even if his or her kicking strength or ball handling ratings are low if those attributes are not specified as important to a goal keeper.

At step 302, the game management engine 240 of the server 130 calculates overall team rating of the team selected by the user. The game management engine 240 calculates the overall team rating based in part on the ratings of the selected players. In some implementations, the game management engine 240 calculates an overall team rating based on ratings of the attributes of the player and the position of the player. In some implementations, the game management engine 240 calculates the overall team rating by assigning weights to the ratings of different players. For example, the game management engine 240, assigns a particular weight for each player that is part of the starting lineup and assigns a different weight for each player that is not part of the starting lineup. The game management engine 240 is configured to calculate ratings for specific attributes of a team. For example, the game management engine 240 can be configured to calculate a rating for offense strength of the team and a rating for the defense strength of the team. The server 130 is configured to present the calculated overall team ratings in a GUI, such as the GUI shown in FIG. 4B. In some implementations, the server 130 may display data related to specific attributes of the team in response to a user interacting with the GUI. For example, in response to a user touching the overall rating of team, the GUI may display ratings of the offense of the team and the ratings of the defense of the team.

As described above, in some implementations, the game management engine 240 transmits the overall team ratings and the ratings of players to the game simulation engine 244 and/or stores the data in the game data storage unit 250. At step 303, the game simulation engine 244 calculates scoring chances for each team. The game simulation engine 244 calculates the scoring chances based on several game factors including, but not limited to, the overall team ratings, the ratings of each attribute of the team, ratings of the players on the team, and/or the like. In some implementations, the game simulation engine 244 is configured to calculate scoring chances across multiple categories. For example, the game simulation engine 244 calculates a certain number of "great scoring chances" "good scoring chances," "mediocre scoring chances," and "counter chances." Example of a great scoring chance can be game situation where the user can easily score, such as a breakaway where the user can easily score. Example of good scoring chance can be where the user's team is in possession of the ball around the third of the way on the playing field away from the opposing team's goal. Example of basic scoring chance can be where the user's team is in possession of the ball and about half way line of the playing field. Example of counter chances can be where the opposing team is in possession of the ball and the user must recover the ball.

Each category of scoring chance is associated with a certain probability of generating scoring plays. For example great scoring chances has the highest probability of generating scoring chances, good scoring chances category has a lower probability of generating scoring plays than great scoring chances category but higher probability than mediocre scoring chances. Similarly, mediocre scoring chances has a lower probability of generating scoring plays than good scoring chances but higher probability than counter chances category. Some categories may be associated with a certain probability value for stopping scoring chances of the opposing team. For example, the counter chances category is associated with a certain probability value of generating defensive plays when the opposing team is in a scoring position.

Figure 4B:

At step 304, the game simulation engine 244 presents the calculated chances of each team on a GUI, such as the GUI shown in FIG. 4B. In some implementations, the game simulation engine 244 presents the categories for which the scoring chances are generated, as shown in the GUI in FIG. 4B. In some implementations, the game simulation engine 244 presents the different categories in different colors and displays the probability for each category of scoring chances according to the color associated with the category, as shown in the GUI in FIG. 4B. At step 305, the game simulation engine 244 simulates the game between two teams. The game simulation engine 244 may be configured to simulate a portion of the game between the two teams until a predetermined type of interaction occurs between the two teams.

Figure 4C:
Figure 4D:
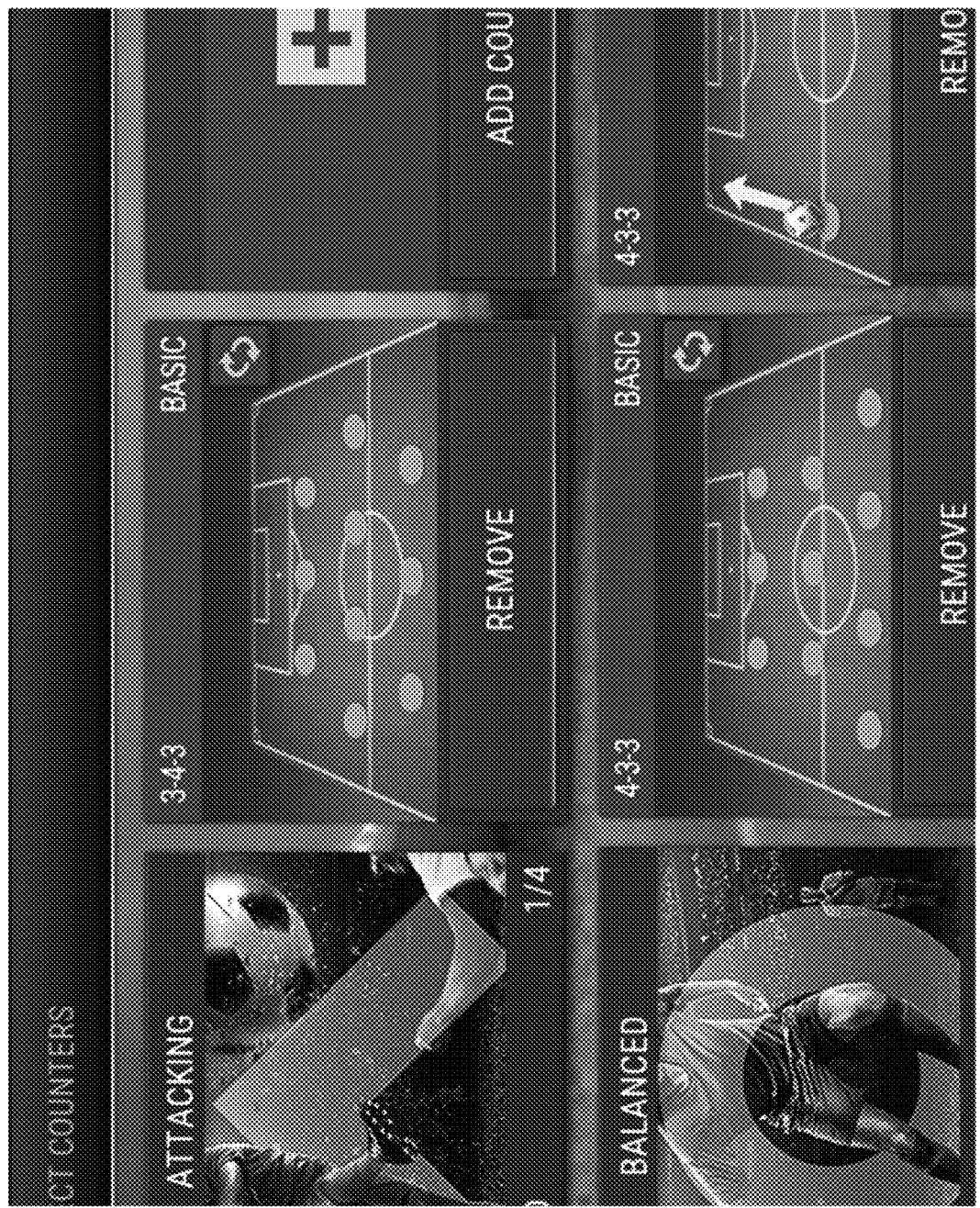

The game simulation engine 244 may be configured to simulate the game or a portion of the game simultaneously between the two teams. For example, the game simulation engine 244 may be configured to start the game at or near the same moment in time for two or more users 170 and simulate the game or a portion of the game simultaneously for the two or more users 170 and display the corresponding GUIs during the simulation on the client devices 110 of each of the users 170 that are playing in the game. In some implementations, the game simulation engine 244 simulates the game in response to a user input. In some implementations, the game simulation engine 244 simulates the game simultaneously for two or more users in response to receiving a user input from each of the two or more users. For example, each of the users may be presented with a GUI that allows for that user to provide an input to start the game by selecting a graphical button that indicates start of the game. The game simulation engine 244 is configured to simulate the game or a portion of the game based on several factors including, but not limited to, the calculated chances for each team. In some implementations, the game simulation engine 244 is configured to simulate the game based on formations selected by each of the users for their corresponding teams, offensive and defensive tactics, such as counters, selected by each of the users for their corresponding teams. The server 130 may present GUI to allow each of the users to select the offensive tactics and counters. The server 130 may simultaneously present GUIs to each of the users to allow them to select the offensive and counter tactics. Examples of these GUIs are shown in FIG. 4C and FIG. 4D.

The game simulation engine 244 is configured to generate a certain number of game situations and scenarios for each category of game chances based on the probability of each category of game chances assigned to the team. For example, if the total number of game situations generated for a team is 10 and the probability of good chances is 60%, the probability of great chances is 20%, and the probability of mediocre chances is 20% for that team, then the game simulation engine 244 generates 6 good chances for scoring, 2 great chances for scoring, and 2 mediocre chances for scoring for that team. In some implementations, the game simulation engine 244 is configured to track, for each team, the number of game situations generated for each category and adjusts the simulation of the game based on the number of game situations generated for each category and the number of game situations that have not been generated for each category. For example, if the probability of great chances is 20% for one of the teams, but if none of the generated game situations were great chances, then the game simulation engine 244 increases probability of great chances such that the number of great chances generated by the end of the game equals 20% of the game situations generated by that team.

As described above, the game simulation engine 244 may be configured to simulate a portion of the game until a predetermined type of interaction occurs between the two teams. At step 306, the game simulation engine 244 identifies a predetermined type of interaction for at least one of the users. As described above, predetermined type of interactions, include, but are not limited to, playable moments for each of the users. As described above, a playable moment in one or more implementations is a scoring chance or a chance to defend against the opposing team. The game simulation engine 244 identifies predetermined type of interactions, including playable moments, for each of the users for their corresponding selected teams. The game simulation engine 244 may be configured to identify a predetermined type of interaction, including a playable moment, for each user based on the calculated scoring chances of the team of the user. In some implementations, the server 130 may communicate to the user of a second team that the user of a first team received a predetermined type of interaction, such as a playable moment. In some implementations, the game simulation engine 244 may be configured to update the calculated number of scoring chances of the team of the user for which the predetermined type of interaction occurred and identified by the game simulation engine 244. In some implementations, the game simulation engine 244 may be configured to update the calculated number of scoring chances simultaneously while simulating the game or a portion of the game. In some implementations, the game simulation engine 244 may be configured to update the calculated number of scoring chances by reducing the number of scoring chances for the team for which the predetermined type of interaction occurred by a threshold number. For example, the number of scoring chances for the team may be reduced by a certain percentage of scoring chances.

At step 307, the game simulation engine 244 is configured to display the predetermined type of interaction, such as a playable moment, to the corresponding user. The game simulation engine 244 may be configured to display the predetermined type of interaction, such as a playable moment, in response to identification of the predetermined type of interaction. In some implementations, the game simulation engine 244 may be configured to display the predetermined type of interaction in response to the generation of a scoring chance or a chance to defend against the opposing team during the simulation of the game or a portion of the game. In displaying the predetermined type of interaction, such as a playable moment, to the corresponding user, the game simulation engine 244 may cause the screen to fade to black and display the playable moment in a GUI, such as the GUI shown in FIG. 4C. In some implementations, each of the users of a first team may transfer messages to the other user or users of the second team in real-time, and may be simultaneously, by transferring the messages to the server 130. The server 130 may transfer any received messages from one user to a second user via the in-game communication engine 242. At step 308, the game simulation engine 244 provides control of at least one player in the playable moment to the corresponding user. In some implementations, the game simulation engine 244 displays graphical icons on the GUI that are configured to accept user inputs. Example of graphical icons that are configured to accept user inputs is shown in FIG. 4C. The game simulation engine 244 may be configured to display the actions being performed by the user that received control of at least one player to the user or users of the opposing team. The game simulation engine 244 may be configured to simultaneously cause the screens on the client devices 110 of the users 170 that are playing against each other to be updated with changes in the game.

At step 309, the game simulation engine 244 updates the game data. In updating game data, the game simulation engine 244 is configured to update state information of the game including updating the number of game situations generated for each of the different scoring chances, the number of times a user has scored during the generated game situations, and the like. The game simulation engine 244 may be configured to update the game data simultaneously for each of the users of the teams. At step 310, the game simulation engine 244 determines whether the game ended. In some implementations the game simulation engine 244 determines whether the game ended if the timer for the game reaches its maximum period or counts down to zero. If the game simulation engine 244 determines that the game has not ended ("NO" at step 310"), then the game simulation engine 244 returns to step 305 and continues with the simulation of the game or a portion of the game. As described above, in some implementations, the game simulation engine 244 may be configured to update the calculated number of scoring chances in response to identifying a predetermined type of interaction or occurrence of the predetermined type of interaction. In some implementations, the game simulation engine 244 may be configured to continue the simulation of the game or portion of the game based on the updated number of scoring chances of the teams at step 305. If the game simulation engine 244 determines that the game has ended ("YES" at step 310), then the game simulation engine 244 continues to step 311.

At step 311, the game simulation engine 244 displays end game GUI and graphics to each of the users of the teams between whom the game was played. As part of displaying the end game GUI and graphics, the game simulation engine 244 determines the winner of the game and identifies the winner of the game in the end game GUI and graphics. In some implementations, the in-game communication engine 242 displays chat suggestions and graphical items, such as emoticons, based on the state of the game. For example, at the end of the game, the in-game communication engine 242 may display chat suggestion that congratulates the opposing user for playing the game.

FIG. 3 set forth an example process 300 for presenting playable highlight moments to a user 170 using a computing device, such as client 110, executing an instance of the game application, such as game application 222, by a server, such as server 130 of FIG. 2. An example will now be described using the example process 300 of FIG. 3 to describe how a player of the video game will receive potential highlight moments within the video game, which the player of the video game can play. An example of the video game application is a soccer video game. An example of the client 110 is a smartphone and a user 170 using the smartphone to play the video game is the video game player. Some examples of playable highlight moments are the plays and moments, during the simulation of the soccer video game, where one or more in-game soccer players are in a position within the video game from where they can easily score a goal or stop an opposing team from scoring a goal. Thus, having potential for a highlight moment for the video game player. The process 300 begins by proceeding to step 301, where in-game player selections are received at a server hosting an instance of the video game application. FIG. 4A is an example screenshot of a GUI of the soccer video game that is displayed on the smartphone of the video game player. The video game player builds his or her team by selecting various in-game soccer players at various positions of the team. For example, as shown in FIG. 4A, the video game can select one or more midfielders for his or her team. The video game player selects the in-game soccer players by using the touch-screen of his or her smartphone, for example, by touching icons displaying the in-game soccer players. As shown in FIG. 4A, the GUI displayed on the smartphone of the video game player, displays overall ratings of in-game soccer players and the video game player may select the in-game soccer players based on the overall ratings of the in-game soccer players.

The selections of the video game player are sent to the server hosting certain video game engines and with which the smartphone of the video game player is communicatively coupled. The process 300 continues to step 302, where the server calculates an overall team rating for the team of the video game player based on the in-game soccer players selected by the video game player. The server may display the overall team rating on a GUI of the video game displayed on the smartphone. An example screenshot of such a GUI is the FIG. 4B, which displays overall team rating for each team of each video game player. As shown in FIG. 4B, the GUI displayed on the smartphone of the video game player may also display a username of the video game player and other information related to the video game player, such as the number of the people that follow that video game player.

The process 300 next continues to step 303, where the server also calculates scoring chances across each category of scoring chances. The process 300 next continues to step 304, where the server may display the information related to the scoring chances on a GUI of the video game displayed on the smartphone, such as the GUI shown in FIG. 4B. As shown in FIG. 4B, the GUI displays the different categories of scoring chances, such as "Great," "Good," "Basic," and "Counter Attack," and for each category of scoring chances, the GUI in FIG. 4B displays the probability of the scoring chance. The video game player can select one or more offensive tactics and counter tactics using one or more GUIs of the soccer video game shown on the smartphone of the video game player. An example screenshot of a GUI that allows the video game player to select one or more offensive tactics is shown in FIG. 4C. The video game player may cycle through various tactics, some of which are shown in the GUI in FIG. 4C, prior to selecting one or more tactics for the game. The tactic that the video game player selects to be utilized in a game may be displayed as an "Active" tactic, as shown in FIG. 4C. The GUI may also display an overall team rating for each tactic, as shown in FIG. 4C. For each tactic, the server may calculate an overall team rating and display the overall team rating for the tactic on the GUI, as shown in FIG. 4C. Similarly, the video game player may select counter tactics using one or more GUIs of the soccer video game shown on the smartphone of the video game player. An example screenshot of a GUI that allows the video game player to select one or more counter tactics is shown in FIG. 4D. The video game player may cycle through the different counter tactics prior to selecting one or more counter tactics.

The process 300 next continues to step 305, where the server simulates the game between two soccer teams that exist within the soccer video game. The process 300 next continues to step 306, where the server identifies a playable moment. An example of the playable moment is when an in-game soccer player on the team controlled by the video-game player is in a position on the soccer field of the soccer video game from where the likelihood of scoring a goal is extremely high. The process 300 next continues to step 307, where the server displays the playable moment on the smartphone of the video game player. The process next continues to step 308, where the server provides control to the video game player of an in-game player closest to the soccer ball. The process next continues to step 309, where the server updates the game data, which may include the amount of time left in the game, the score of the game, and the like. The process next continues to step 310, where the server determines if the game has ended. If the game has not ended for the video game player, the process continues to step 305, where the server continues the simulation of the video game. If the game has ended for the video game player, the process next continues to step 311, where the server displays a GUI that specifies that the game for the video game player has ended, and the process 300 ends.

Hardware Overview

Figure 5:
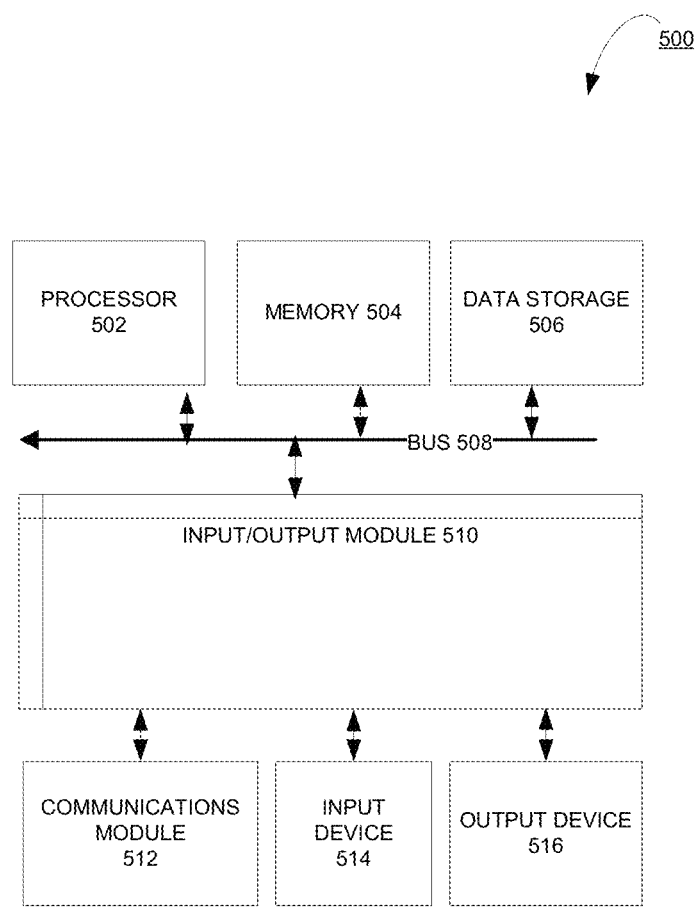
FIG. 5 is a block diagram illustrating an example computer system with which the clients and servers of FIG. 2 can be implemented.

FIG. 5 is a block diagram illustrating an example computer system 500 with which a client 110, such as client 110*a*, client 110*b*, client 110*c*, or client 110*d*, and a server 130, such as server 130*a*, and/or server 130*b*, of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110*a*, and server 130) includes a bus 508 or other communication mechanism for communicating information, and a processor 502 (e.g., processor 212, 252, 236) coupled with bus 508 for processing information. According to one aspect, the computer system 500 can be a cloud computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220, and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices (e.g., input device 216, output device 214). The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, wired communication in some implementations, or wireless communication in other implementations, and multiple interfaces may also be used. The input/output module 510 is configured to connect to a communications module 512. Example communications modules 512 (e.g., communications module 218, 258, and 238) include networking interface cards, such as Ethernet cards and modems.

The components of the system can be interconnected by any form or medium of digital data communication (e.g., a communication network). The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic, or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link, and communications module 512. In the Internet example, a server might transmit a requested code for an application program through the Internet, the ISP, the local network, and communications module 512. The received code may be executed by processor 502 as it is received, and/or stored in data storage 506 for later execution.

In certain aspects, the input/output module 510 is configured to connect to a plurality of devices, such as an input device 514 (e.g., input device 216) and/or an output device 516 (e.g., output device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 516 include display devices, such as an LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 516 may comprise appropriate circuitry for driving the output device 516 to present graphical and other information to a user.

According to one aspect of the present disclosure, the client 110A can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 508. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method comprising:
receiving, from a device of a user, a plurality of player selections for a first team in a game between the first team and a second team;
calculating, based on the plurality of player selections for the first team, an overall team rating for the first team;
calculating a number of scoring chances for the first team in the game, wherein each of the scoring chances is associated with a category of scoring chances, the category of scoring chances comprising at least one of a great scoring chance, a good scoring chance, a mediocre scoring chance, or a counter chance;
assigning a probability value for each category of scoring chances;
updating the number of scoring chances for each category of scoring chances based on the probability value assigned to each category of scoring chances;
simulating, based on the number of scoring chances, a first portion of the game between the first team and the second team until a first predetermined type of interaction between the first team and the second team occurs, wherein the first predetermined type of interaction is a first playable moment in the game, the first playable moment comprising at least one of a first scoring chance or a first chance to defend against the second team by the user;
displaying, on the device of the user, the first predetermined type of interaction in the game;
providing control of the first team to the device of the user for the first predetermined type of interaction during the first playable moment in the game;
simulating, based on the number of scoring chances, a second portion of the game between the first team and the second team until a second predetermined type of interaction between the first team and the second team occurs, wherein the second predetermined type of interaction is a second playable moment in the game, the second playable moment comprising at least one of a second scoring chance or a second chance to defend against the second team by the user;
displaying, on the device of the user, the second predetermined type of interaction in the game; and
providing control of the first team to the device of the user for the second predetermined type of interaction during the second playable moment in the game.

2. The computer-implemented method of claim 1, wherein calculating scoring chances for the first team is based on the overall team rating for the first team.

3. The computer-implemented method of claim 1, further comprising:
updating the number of scoring chances for the first team by reducing the number of scoring chances for the first team by a threshold number.

4. The computer-implemented method of claim 1, further comprising:
adjusting the probability values for each category of scoring chances based on a number of scoring chances generated for a category of scoring chances; and
simulating the first portion of the game based on the adjusted probability values.

5. The computer-implemented method of claim 1, wherein providing control of the first team to the device of the user includes displaying, on the device of the user, a graphical icon configured to receive input.

6. The computer-implemented method of claim 1, wherein calculating the overall team rating for the first team is based on overall ratings of the players selected for the first team.

7. The computer-implemented method of claim 1, further comprising:
displaying the number of scoring chances by categories of scoring chances.

8. A system comprising:
a memory storing sequences of instructions; and
a processor configured to execute the sequences of instructions, which when executed, cause the processor to perform:
receiving, from a device of a user, a plurality of player selections for a first team in a game between the first team and a second team;
calculating, based on the plurality of player selections for the first team, an overall team rating for the first team;
calculating, based on the overall team rating for the first team, a number of scoring chances for the first team in the game, wherein each of the scoring chances is associated with a category of scoring chances, the category of scoring chances comprising at least one of a great scoring chance, a good scoring chance, a mediocre scoring chance, or a counter chance;
assigning a probability value for each category of scoring chances;
updating the number of scoring chances for each category of scoring chances based on the probability value assigned to each category of scoring chances;
simulating, based on the number of scoring chances, a first portion of the game between the first team and the second team until a first predetermined type of interaction between the first team and the second team occurs, wherein the first predetermined type of interaction is a first playable moment in the game, the first playable moment comprising at least one of a first scoring chance or a first chance to defend against the second team by the user;
displaying, on the device of the user, the first predetermined type of interaction in the game;
providing control of the first team to the device of the user for the first predetermined type of interaction during the first playable moment in the game;
simulating, based on the number of scoring chances, a second portion of the game between the first team and the second team until a second predetermined type of interaction between the first team and the second team occurs, wherein the second predetermined type of interaction is a second playable moment in the game, the second playable moment comprising at least one of a second scoring chance or a second chance to defend against the second team by the user;
displaying, on the device of the user, the second predetermined type of interaction in the game; and providing control of the first team to the device of the user for the second predetermined type of interaction during the second playable moment in the game.

9. The system of claim 8, further comprising stored sequences of instructions, which when executed by the processor, cause the processor to perform:
updating the number of scoring chances for the first team by reducing the number of scoring chances for the first team by a threshold number.

10. The system of claim 8, further comprising stored sequences of instructions, which when executed by the processor, cause the processor to perform:
adjusting the probability values for each category of scoring chances based on a number of scoring chances generated for a category of scoring chances;
displaying the number of scoring chances by categories of scoring chances; and
simulating the first portion of the game based on the adjusted probability values.

11. The system of claim 8, wherein providing control of the first team to the device of the user includes displaying, on the device of the user, a graphical icon configured to receive input.

12. The system of claim 8, wherein calculating the overall team rating for the first team is based on overall ratings of the players selected for the first team.

13. The system of claim 8, further comprising stored sequences of instructions, which when executed by the processor, cause the processor to perform:
receiving, from a device of a second user, a plurality of player selections for the second team, wherein the user and the second user are different users;
simulating the portion of the game between the first team and the second team based on the number of scoring chances for the first team and the number of scoring chances for the second team.

14. A non-transitory machine-readable storage medium comprising machine-readable instructions, which when executed by a processor, cause the processor to perform a method comprising:
receiving, from a device of a user, a plurality of player selections for a first team in a game between the first team and a second team;
calculating, based on the plurality of player selections for the first team, an overall team rating for the first team;
calculating, based on the overall team rating for the first team, a number of scoring chances for the first team in the game, wherein each of the scoring chances is associated with a category of scoring chances, the category of scoring chances comprising at least one of a great scoring chance, a good scoring chance, a mediocre scoring chance, or a counter chance;
assigning, based on the overall team rating for the first team, a probability value for each of a plurality of category of scoring chances;
updating, based on the probability value assigned to the category of scoring chances, the number of scoring chances for the first team in the game, wherein each of the scoring chances is associated with at least one category of the plurality of category of scoring chances;
simulating, based on the number of scoring chances for the first team and the category of scoring chances, a first portion of the game between the first team and the second team until a first predetermined type of interaction between the first team and the second team occurs, wherein the first predetermined type of interaction is a first playable moment in the game, the first playable moment comprising at least one of a first scoring chance or a first chance to defend against the second team by the user;
displaying, on the device of the user, the first predetermined type of interaction in the game;
providing control of the first team to the device of the user for the predetermined type of interaction during the first playable moment in the game;
simulating, based on the number of scoring chances, a second portion of the game between the first team and the second team until a second predetermined type of interaction between the first team and the second team occurs, wherein the second predetermined type of interaction is a second playable moment in the game, the second playable moment comprising at least one of a second scoring chance or a second chance to defend against the second team by the user;
displaying, on the device of the user, the second predetermined type of interaction in the game; and
providing control of the first team to the device of the user for the second predetermined type of interaction during the second playable moment in the game.

\* \* \* \* \*

UNITED STATES PATENT AND TRADEMARK OFFICE
CERTIFICATE OF CORRECTION

PATENT NO. : 10,926,178 B1  
APPLICATION NO. : 16/024592  
DATED : February 23, 2021  
INVENTOR(S) : Joseph Todd Batty and Thomas Andrew Phillips Munro Page 1 of 1

It is certified that error appears in the above-identified patent and that said Letters Patent is hereby corrected as shown below:

In the Claims

At Column 22, Line 2, for Claim 4, please delete "a" after "scoring chances based on" and before "number", add "the".

At Column 22, Line 3, for Claim 4, please delete "a" after "generated for" and before "category", add "the".

At Column 22, Line 12, for Claim 6, please delete the word "the" after "ratings of" and before "players".

At Column 23, Line 4, for Claim 9, please add the word "the" after "further comprising" and before "stored".

At Column 23, Line 10, for Claim 10, please add the word "the" after "further comprising" and before "stored".

At Column 23, Line 16, for Claim 10, please delete "a" after "scoring chances based on" and before "number", add "the".

At Column 23, Line 26, for Claim 12, please delete the word "the" after "ratings of" and before "players".

At Column 24, Lines 9 and 10, for Claim 14, please add the word "category" after "value for each" and before "of a plurality"; and please delete "category" after "plurality of" and add "categories" before "of scoring chances;".

At Column 24, Line 15, for Claim 14, please delete "category" after "plurality of" and add "categories" before "of scoring chances;".

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*